Aug. 7, 1928.

A. G. ANDREWS

DISH DRIER

Filed Aug. 15, 1925

1,679,594

Inventor
Arthur G. Andrews
By Wilson and McCanna
Attys.

Patented Aug. 7, 1928.

1,679,594

UNITED STATES PATENT OFFICE.

ARTHUR G. ANDREWS, OF ROCKFORD, ILLINOIS, ASSIGNOR TO THE WASHBURN COMPANY, OF WORCESTER, MASSACHUSETTS, A CORPORATION OF MASSACHUSETTS.

DISH DRIER.

Application filed August 15, 1925. Serial No. 50,367.

This invention relates to dish washing apparatus and more particularly to dish driers or drainers for the reception of washed dishes and silverware while piping hot water is poured over the same for final rinsing and cleaning, and while they drain and dry.

The principal object of my invention is to provide an improved dish drier of this type especially adapted for ordinary household use.

Generally stated, my invention provides a dish drier consisting of a drain pan having a dish-supporting tray therein and a silverware holder supported thereon in a particularly advantageous manner. The drain pan is closed on all sides except at one end through which the pan drains and has the silverware holder supported at the open end exteriorly of the pan to drain into the same place. Both the silverware holder and the dish tray are pivoted to the pan to be swung out of the way to afford a clean sweep of the pan from one end to the other to permit cleaning the same. The silverware is laid flat in the holder to avoid obstruction at the end of the pan to the stacking of dishes. The holder serves to close the open end of the pan, except for a slight space through which draining occurs, in order to prevent the displacement of articles from the pan out through the open end. The invention has further advantages which will be brought out in the course of the following detailed description in which reference is is made to the accompanying drawing, wherein—

In the views the same reference numerals are applied to corresponding parts.

Figure 1:
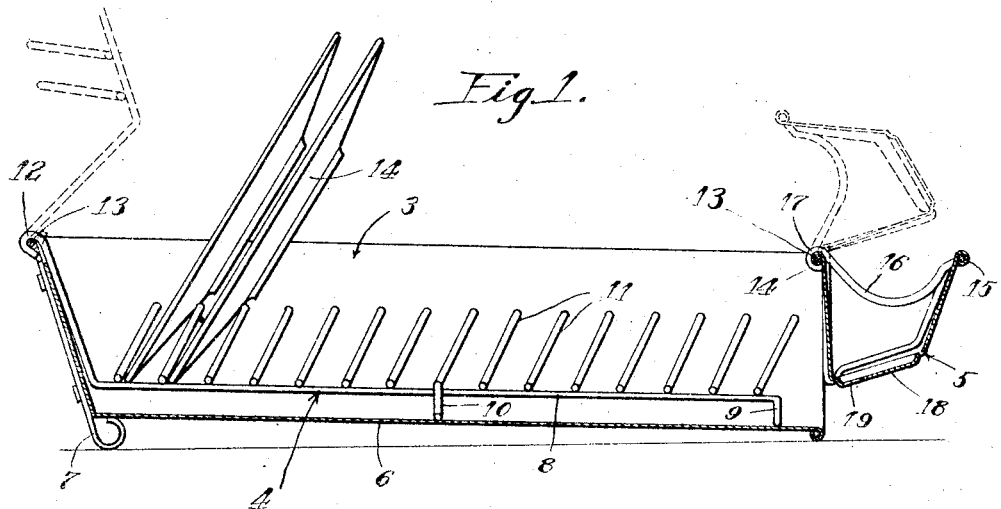
Fig. 1 is a longitudinal, vertical, cross-section through a dish drier made in accordance with my invention illustrating both the advantageous manner of stacking the dishes therein after the manner contemplated by my invention, and also the manner of swinging the dish tray and silverware holder out of the way to facilitate cleaning the pan. This view is taken on the line 1—1 of Fig. 2.

The dish drier comprises a drain pan 3, a dish supporting tray 4 and silverware holder or rack 5. The drain pan is suitably of sheet metal construction closed on all sides except at the end where the holder 5 is mounted, the pan draining through this end by virtue of the inclination of its bottom 6. Brackets 7 are riveted to the closed end of the pan to support the same in the inclined draining position. The drier is arranged to be supported on a table alongside the sink or on a drain rack extending from one side of the sink so as to be within convenient reach for placing dishes and silverware therein, from which the soapy water may drain into the sink. With my device, it is contemplated to rinse the dishes and silverware with piping hot water for the final cleaning and drying. Usually silverware is not allowed to dry by itself but must be dried in the usual way in order to avoid spotting. For this reason, it is a convenience to have the silverware in a separate holder where it may be accessible without disturbing the dishes. Aside from this fact, it is of advantage to keep the silverware apart because it tends to nick the dishes and is otherwise in the way in the pan when it is desired to place dishes therein.

The dish tray 4 comprises longitudinal members 8 extending lengthwise of the bottom of the pan supported by a leg 9 at the one end formed by bending the single piece of wire of which the longitudinal members 8 are formed, and supported intermediate the ends by a leg 10 constituting an extension of one of the cross-wires 11 which are soldered or welded onto the longitudinal members 8. The ends of the members 8 extend up the closed end of the pan and are pivoted, as indicated at 12, to a wire reinforcing frame 13 in the top of the pan 3. The cross-wires 11 are arranged in parallel relation and lie in parallel planes all inclined to the plane of the bottom of the pan toward the open end of the pan in order to support plates and the like, indicated at 14, in edgewise relation and inclined toward the open end of the pan. The arrangement is of advantage in rinsing the dishes in that it avoids pouring water alongside the pan at the closed end when an effort is made to rinse the last plate or other dish standing in the tray, as illustrated in the drawing. Ample space is left by this arrangement at the last plate between the plate and the closed end of the pan. Obviously, there is no harm done if some water is poured outside the open end of the pan in an effort to thoroughly rinse the last plate or other dish in the tray, in that end of the pan, since this water is poured directly or indirectly into the sink. With the reverse inclination such water was poured onto the table or onto the floor, or else the housewife was apt to avoid rinsing the end dish or so. The provision of the pivotal mounting at 12 enables swinging the tray out of the pan, as indicated in dotted lines in Fig. 1, to afford access to all sides of the tray itself, but principally for the purpose of giving a clean sweep of the pan from end to end in order that it may easily be cleaned and dried before the drier is put away after using.

Figure 2:
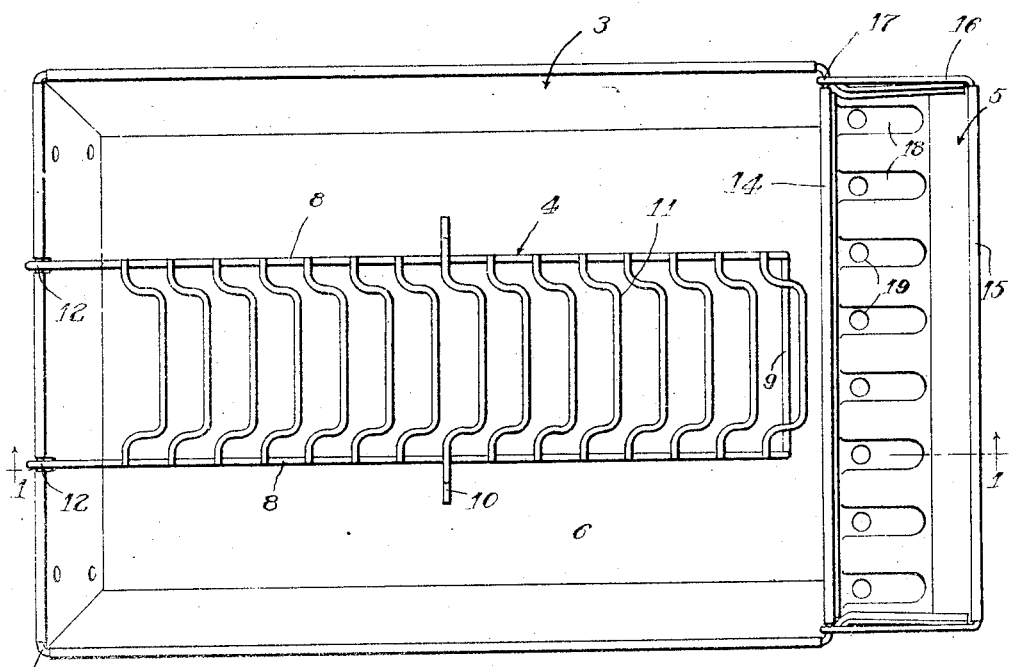
Fig. 2 is a plan view of the drier.

The silverware holder or rack 5 is preferably of sheet metal formed in a trough shape, as shown, having the one side 14 thereof bent around the wire reinforcing frame 13 for pivotally supporting the holder. The other side 15 is bent around a wire frame 16 which extends the length of the holder and has inturned ends looped, as indicated at 17, about the wire frame 13 of the drain pan. The holder is preferably open at both ends and extends substantially the width of the drain pan so that knives and forks and other silverware can be laid flat therein crosswise relative to the pan. The drain pan 3 is smaller at the bottom than at the top and the side walls taper from top to bottom. This construction affords a rest for the holder 5 on the ends of the side walls, since the holder extends substantially across the entire width of the top of the pan and at its bottom extends somewhat beyond the side walls of the pan, as will be apparent from a study of Fig. 2. The holder substantially closes the open end of the pan, as indicated most clearly in Fig. 1, except for a slight space underneath the same for the draining of water from the pan. By closing the end of the pan the sliding of dishes out of the pan is avoided, cups, butter dishes and the like being placed directly on the bottom of the pan alongside the dish tray which would otherwise be apt to slide out and fall into the sink. The silverware holder has a series of drain grooves or pockets 18 formed therein, as shown most clearly in Fig. 2, with openings 19 provided therein at the lowermost portion thereof. By dispersing the drain grooves and openings in this manner, I avoid the contingency of water draining out one end of the holder onto the floor. The holder, by virtue of its pivotal connection at 14 and 17, is capable of being swung out of the way, as indicated in dotted lines in Fig. 1, similarly as the dish tray 4 thereby affording a clean sweep of the pan from the closed end out through the open end, as previously referred to.

The drain pan and the silverware holder are smaller at their bottoms than at their open tops to enable stacking one drier on another in nested relation, one pan setting in another with its holder in the holder of the other. This feature is obviously advantageous in storing the driers or in shipping the same.

I claim:

1. In a dish drier or drainer, a sheet metal drain pan having one end open for drainage of water therefrom into an adjacent sink or other drain receptacle, and a dish tray in said pan composed of longitudinal supporting wires resting on the bottom of the pan and cross-wires projecting upwardly therefrom, the longitudinal wires being bent upwardly at the closed end of the pan and pivotally attached to the upper edge of the pan on the said closed end thereof, and the cross-wires being disposed in substantially parallel relation to one another and all inclined toward the open end of the pan substantially as and for the purposes described.

2. A dish drier comprising a sheet metal drain pan for receiving draining dishes, said pan being closed on all sides except one through which the pan drains and being suitably inclined toward said open side for drainage purposes, and a silverware rack supported on the pan at the open side thereof to drain into the same place as the pan, said rack extending entirely across the open side of the pan substantially to close the same against the exit of dishes therefrom but leaving a slight space beneath the bottom thereof to permit drainage from the pan.

3. A dish drier or drainer comprising a sheet metal drain pan for receiving draining dishes, said pan being closed on all sides except one through which the pan drains and being suitably inclined toward said open side for drainage purposes, said pan having the upper edges thereof rolled about a wire reinforcing frame for the requisite strength and rigidity, the said wire frame having a portion thereof extending across the top of the open side of the pan, and a sheet metal silverware holding trough extending crosswise of the open side of said pan and supported on the last mentioned portion of said wire frame, the upper edge of one wall of said trough being rolled about said wire, and said trough having a wire about which the upper edge of the other wall thereof is rolled for the requisite strength and rigidity, the end portions of said wire being bent to extend across the ends of the trough and having the free ends thereof looped about the first mentioned wire frame.

4. A device as set forth in claim 3 wherein the sheet metal silverware holding trough has a plurality of transverse drain grooves struck therein at points spaced lengthwise thereof, said drain grooves being provided with drain openings.

In witness of the foregoing I affix my signature.

ARTHUR G. ANDREWS.